US012737548B2

(12) United States Patent
Wang et al.

(10) Patent No.: US 12,737,548 B2
(45) Date of Patent: Sep. 15, 2026

(54) METHOD, DEVICE, AND COMPUTER PROGRAM PRODUCT FOR GENERATING TABLE

(71) Applicant: Dell Products L.P., Round Rock, TX (US)

(72) Inventors: Zijia Wang, London (GB); Jinpeng Liu, Shanghai (CN); Bin He, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/649,205

(22) Filed: Apr. 29, 2024

(65) Prior Publication Data

US 2025/0322172 A1 Oct. 16, 2025

(30) Foreign Application Priority Data

Apr. 11, 2024 (CN) ........................ 202410437156.X

(51) Int. Cl.
*G06F 40/30* (2020.01)
*G06F 16/242* (2019.01)

(52) U.S. Cl.
CPC ............ *G06F 40/30* (2020.01); *G06F 16/243* (2019.01)

(58) Field of Classification Search
None
See application file for complete search history.

(56) References Cited

U.S. PATENT DOCUMENTS

2018/0322339 A1* 11/2018 Cohen .................... G06V 10/82
2021/0049357 A1* 2/2021 Sarkar ................. G06V 30/412
2022/0318235 A1* 10/2022 Wei ....................... G06F 16/256
2023/0080686 A1* 3/2023 Gupta .................. G06F 16/221 726/26
2024/0212162 A1* 6/2024 Yin .......................... G06T 7/11

(Continued)

OTHER PUBLICATIONS

Training Method and Device of Data Generating System Based on Differential Privacy, CN 113642731 A, Xiong, Tao (Year: 2021).*

(Continued)

*Primary Examiner* — Paras D Shah
*Assistant Examiner* — Ali M Hassan
(74) *Attorney, Agent, or Firm* — Ryan, Mason & Lewis, LLP

(57) ABSTRACT

A method in an illustrative embodiment includes blocking cells with predetermined attributes in a first table by performing semantic segmentation on the first table, to obtain a blocked first table. The method further includes converting the blocked first table to a first text. The method further includes generating a second text in a form of natural language based on an understanding of the first text. The method further includes generating a second table corresponding to the first table based on the second text. In this way, the cells containing sensitive information can be identified and blocked, thereby retaining other useful information of the table while protecting privacy. Moreover, using the text in a form of natural language as an intermediate processing result can increase the transparency of table generation, lower the risk of data distortion, and improve the accuracy and consistency of synthetic data while protecting data privacy.

20 Claims, 6 Drawing Sheets

(56) References Cited

U.S. PATENT DOCUMENTS

| | | | | |
|---|---|---|---|---|
| 2024/0281648 A1* | 8/2024 | Ganesan | ................ | G06N 5/022 |
| 2024/0370706 A1* | 11/2024 | Marwood | ............ | G06N 3/0464 |
| 2025/0036809 A1* | 1/2025 | Nadav | ................. | G06F 21/6254 |
| 2025/0157176 A1* | 5/2025 | Yin | ........................ | G06V 10/26 |
| 2025/0174015 A1* | 5/2025 | Schmid | .................. | G06V 20/56 |

OTHER PUBLICATIONS

Carballo, Kimberly Villalobos, et al. "Tabtext: A flexible and contextual approach to tabular data representation." arXiv preprint arXiv: 2206.10381 (2022). (Year: 2022).*
Duong, Song, et al. "Learning from multiple sources for data-to-text and text-to-data." International Conference on Artificial Intelligence and Statistics. PMLR, 2023. (Year: 2023).*
Dong, Li, et al. "Unified language model pre-training for natural language understanding and generation." Advances in neural information processing systems 32 (2019). (Year: 2019).*
S. R. Qasim et al., "Rethinking Table Recognition using Graph Neural Networks," arXiv:1905.13391v2, Jul. 3, 2019, 6 pages.
S. Schreiber et al., "DeepDeSRT: Deep Learning for Detection and Structure Recognition of Tables in Document Images," 14th IAPR International Conference on Document Analysis and Recognition (ICDAR), Nov. 2017, 6 pages.
X. Zong et al., "PubLayNet: Largest Dataset Ever for Document Layout Analysis," arXiv:1908.07836v1, Aug. 16, 2019, 8 pages.
C. Liu et al., "AutoCaption: An Approach to Generate Natural Language Description from Visualization Automatically," IEEE Pacific Visualization Symposium, Jun. 2020, pp. 191-195.
T. Liu et al., "Table-to-Text Generation by Structure-Aware Seq2seq Learning," The Thirty-Second AAAI Conference on Artificial Intelligence, Feb. 2018, pp. 4881-4888.
K. V. Carballo et al., "TabText: A Flexible and Contextual Approach to Tabular Data Representation," arXiv:2206.10381v4, Jul. 21, 2023, 17 pages.
C. Dwork et al., "Calibrating Noise to Sensitivity in Private Data Analysis," Journal of Privacy and Confidentiality, vol. 7, No. 3, May 2017, pp. 17-51.
F. Mcsherry et al., "Mechanism Design via Differential Privacy," 16th Annual Symposium on Foundations of Computer Science, Nov. 2007, 10 pages.
M. Abadi et al., "Deep Learning with Differential Privacy," arXiv:1607.00133v2, Oct. 24, 2016, 14 pages.
T. B. Brown et al., "Language Models are Few-Shot Learners," 34th Conference on Neural Information Processing Systems, Dec. 2020, 25 pages.
C. Raffel et al., "Exploring the Limits of Transfer Learning with a Unified Text-to-Text Transformer," Journal of Machine Learning Research, vol. 21, Jun. 2020, 67 pages.
Z. Zhao et al., "CTAB-GAN: Effective Table Data Synthesizing," arXiv:2102.08369v2, May 31, 2021, 11 pages.
Z. Zhao et al., "CTAB-GAN+: Enhancing Tabular Data Synthesis," Frontiers in Big Data, Jan. 8, 2024, 17 pages.
Q. Zhang et al., "Learning Graph Structure via Graph Convolutional Networks," Pattern Recognition, vol. 95, Nov. 2019, pp. 308-318.

* cited by examiner

METHOD, DEVICE, AND COMPUTER PROGRAM PRODUCT FOR GENERATING TABLE

RELATED APPLICATION

The present application claims priority to Chinese Patent Application No. 202410437156.X, filed Apr. 11, 2024, and entitled "Method, Device, and Computer Program Product for Generating Table," which is incorporated by reference herein in its entirety.

FIELD

Embodiments of the present disclosure relate to the field of data synthesis, and more particularly, to a method, a device, and a computer program product for generating a table.

BACKGROUND

As a fundamental part of data science, table data plays a vital role in all walks of life. Tables present data clearly with rows and columns to enable people to easily understand, analyze, and process information. However, with the increasing demand for data sharing, a pressing issue arises about how to retain the data efficiency in analysis and learning while protecting privacy.

In reality, the table data often contains a substantial amount of sensitive information or other private information, such as personal identity information, financial information, and health condition information. Leakage of such information can not only bring about great harm to individuals, but also may trigger serious social problems. Therefore, as for the sharing of table data, rigorous measures for privacy protection must be taken on the premise of guaranteeing the authenticity of the table data.

SUMMARY

Embodiments of the present disclosure provide a method, a device, and a computer program product for generating a table.

In a first aspect of embodiments of the present disclosure, a method for generating a table is provided. The method includes blocking cells with predetermined attributes in a first table by performing semantic segmentation on the first table. The method further includes converting the blocked first table to a first text. The method further includes generating a second text in a form of natural language based on an understanding of the first text. The method further includes generating a second table corresponding to the first table based on the second text.

In a second aspect of embodiments of the present disclosure, an electronic device is provided. The electronic device includes at least one processor, and a memory coupled to the at least one processor and having instructions stored therein, wherein the instructions, when executed by the at least one processor, cause the electronic device to perform actions. The actions comprise blocking cells with predetermined attributes in a first table by performing semantic segmentation on the first table, to obtain a blocked first table, converting the blocked first table to a first text, generating a second text in a form of natural language based on an understanding of the first text, and generating a second table corresponding to the first table based on the second text.

In a third aspect of embodiments of the present disclosure, a computer program product is provided. The computer program product is tangibly stored on a non-transitory computer-readable medium and comprises machine-executable instructions, and the machine-executable instructions, when executed by a machine, cause the machine to perform actions. The actions comprise blocking cells with predetermined attributes in a first table by performing semantic segmentation on the first table, to obtain a blocked first table, converting the blocked first table to a first text, generating a second text in a form of natural language based on an understanding of the first text, and generating a second table corresponding to the first table based on the second text.

It should be understood that the content described in this Summary is neither intended to limit key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
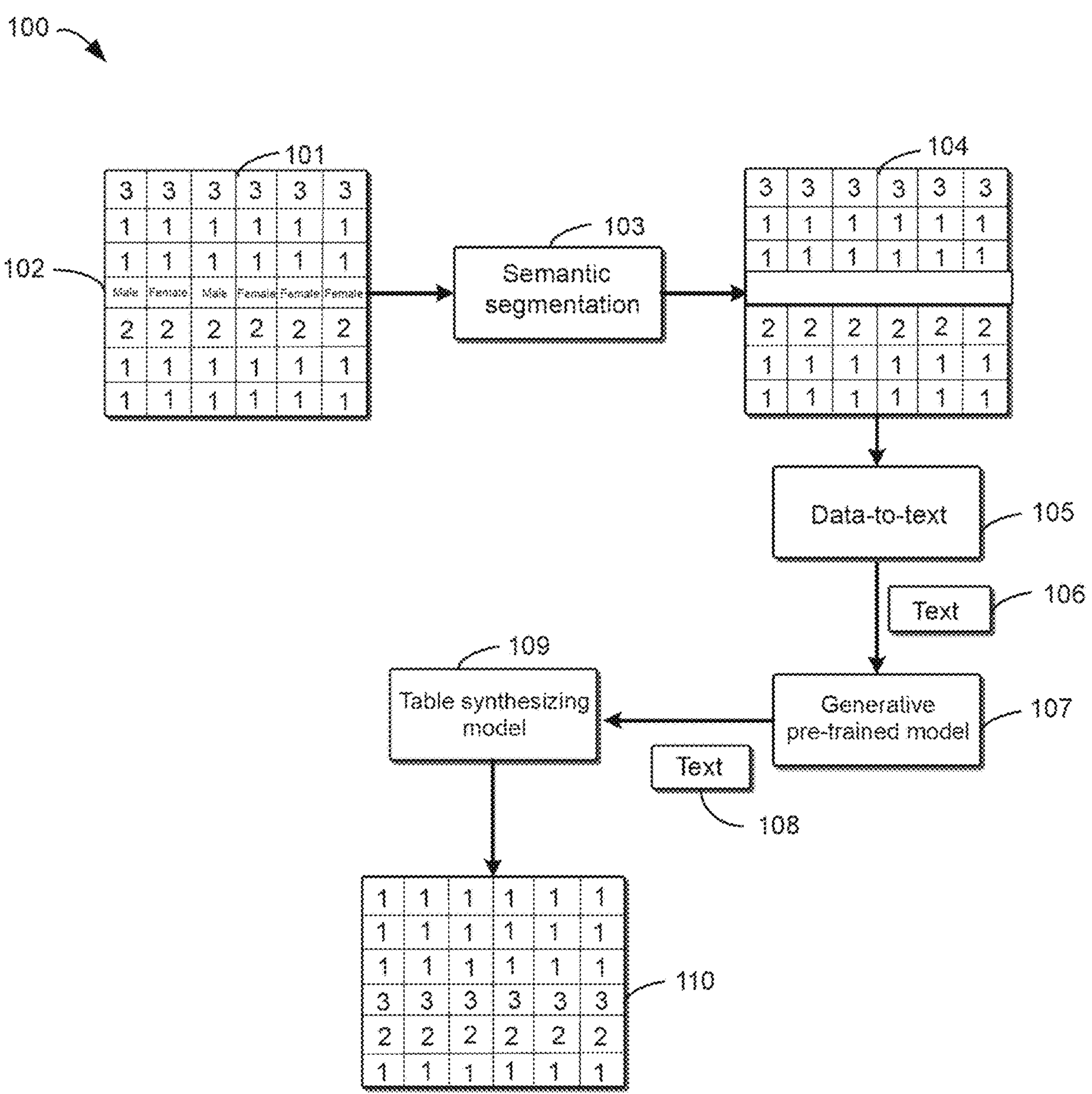
FIG. 1 is a schematic diagram of an example environment in which a plurality of embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects, unless explicitly illustrated. Other explicit and implicit definitions may also be included below.

In related technologies, a common method of generating shared table data is performing privacy processing on the data in an original table and converting the original table to a latent embedding representation. The latent embedding is generally an encoding form, which tries to capture the internal structure and relationship of original table data. However, such conversion is often a non-transparent operation, which makes it impossible to intuitively understand or explain how the latent embedding is generated from original data. Given the encoding nature of latent embedding, it is hard to directly reveal whether the converted data is correct, and impossible to verify whether the latent embedding faithfully retains the features and information of original data simply by checking the latent embedding. Such non-transparency increases uncertainty in the process of generating synthetic table data as well as the risk of data distortion.

In addition, performing privacy processing on latent embedding to generate the synthetic table data may further worsen the problems of data consistency and accuracy. Privacy processing typically involves noise addition and confusion or deletion of some information to protect the privacy of original table data. However, these operations may increase deviation between the synthetic table data and the original table data, resulting in low consistency. Therefore, this method of generating shared table data based on latent embedding often encounters the problems of low consistency between the synthetic table data and the shared table data, and low accuracy of the synthetic data. In practical applications, it may lead to consequences such as inaccurate analysis result, model performance decline, and decision-making mistakes.

In view of this, embodiments of the present disclosure provide a method for generating a table. The method blocks cells with predetermined attributes in an original table at first, then, converts the blocked original table to a readable text, generates a text in a form of natural language according to an understanding of the readable text, and finally, generates a synthetic table according to the text in a form of natural language. In this way, the cells containing sensitive information can be identified and blocked, thereby retaining other useful information of the table while protecting privacy. Moreover, using the text as an intermediate processing result can increase the transparency of table generation, lower the risk of data distortion, and improve the accuracy and consistency of the synthetic data while protecting data privacy. This method not only helps promote the sharing and use of table data, but also can provide more reliable and effective data support.

FIG. 1 is a schematic diagram of an example environment 100 in which a plurality of embodiments of the present disclosure can be implemented. As shown in FIG. 1, the example environment 100 may include an original table 101, where the original table 101 typically refers to a data table that is directly collected or recorded without any processing or modification. The original table 101 contains the original data collected from real business scenarios or studies, and these data may be input by users, collected by machines, or acquired by other means. In some embodiments, the original table 101 may contain cells 102 with predetermined attributes, where the cells 102 with predetermined attributes may be cells containing sensitive information or other private information, such as personal identity information, financial information, and health condition information.

In some embodiments, semantic segmentation 103 may be performed on the original table 101 at first to identify and block the cells 102 with predetermined attributes. In the process of semantic segmentation 103, the cells 102 with predetermined attributes can be blocked by means of region-based semantic segmentation, mask classification, graph convolutional network (GCN), etc., or by using other semantic segmentation models that can be effectively applied to original table data, which may be selected according to actual needs as long as it achieves the aim of effective blocking and protection for sensitive information. If GCN is used for semantic segmentation, a pre-trained GCN may be adopted, or a specific GCN may be trained for the original table 101.

According to embodiments of the present disclosure, a blocked original table 104 is obtained after the semantic segmentation 103 is performed on the original table 101, and the blocked original table 104 may be converted to a readable text 106 by data-to-text conversion 105. For example, if the blocked original table 104 contains 24 cells of "1," then corresponding readable text 106 is "24 1s." The data-to-text conversion 105 may be a method commonly used in related technologies, and the selection of a conversion method depends on specific requirements on the table structure, content, and target text and specifically according to actual needs.

With reference to FIG. 1, the example environment 100 may also include a generative pre-trained model 107, where the generative pre-trained model 107 may be one of the models for realizing natural language processing ability through pre-training, e.g., a large language model. In embodiments of the present disclosure, a text 108 in a form of natural language may be generated based on an understanding of the readable text 106 by the generative pre-trained model 107. Using the text 108 in a form of natural language as an intermediate processing result can increase the transparency of table generation, lower the risk of data distortion, and improve the accuracy and consistency of synthetic data while protecting data privacy.

In some embodiments, after the generative pre-trained model 107 generates the text 108 in a form of natural language, a synthetic table 110 may be generated by use of a table synthesizing model 109 according to the input text 108. The synthetic table 110 corresponds to the original table 101. It should be understood that the issue concerning the privacy protection for table data involves the generation of synthetic data; the data of the synthetic table 110 can replace the data of the original table 101 without leaking any sensitive or identifiable information; and the synthetic table 110 can mimic the features of the original table 101, such as distribution, correlation, and mode. For example, assume a given dataset $D=\{x_1, x_2, \ldots x_n\}$ of the original table 101, where $x_i$ is a data point consisting of a plurality of attributes or fields, and privacy budget $\in$ is used for measuring the maximum allowable privacy loss, with an aim of generating a dataset $\hat{D}=\{\hat{x}_1, \hat{x}_2, \ldots \hat{x}_n\}$ of the synthetic table 110, where $\hat{x}_i$ is a synthetic data point in the same mode as $x_i$. The dataset $\hat{D}$ of the synthetic table 110 should satisfy $\in$-differential privacy, which means that regardless of whether any individual data point $x_i$ is in the dataset D of the original table 101, the chance of generating the dataset $\hat{D}$ of the synthetic table 110 remains almost the same. The dataset $\hat{D}$ of the synthetic table 110 should retain the statistical characteristics and semantics of the dataset D of the original table 101, such as distribution, correlation, trend, or mode.

In addition, the dataset $\hat{D}$ of the synthetic table 110 should contain diversified, real data points, and these data points can cover possible ranges and changes of the dataset D of the original table 101.

As indicated above, the method of the present disclosure blocks the cells with predetermined attributes in an original table at first, then, converts the blocked original table to a readable text, generates a text in a form of natural language according to an understanding of the readable text, and finally, generates a synthetic table according to the text in a form of natural language. In this way, the cells containing sensitive information can be identified and blocked, thereby retaining other useful information of the table while protecting privacy. Moreover, using the text in a form of natural language as an intermediate processing result can increase the transparency of table generation, lower the risk of data distortion, and improve the accuracy and consistency of synthetic data while protecting data privacy. This method not only helps promote the sharing and use of table data, but also can provide more reliable and effective data support.

It should be understood that description of the architecture and function in the example environment 100 is made for illustrative purposes only and does not imply any limitation to the scope of the present disclosure. Embodiments of the present disclosure may also be applied to other environments having different structures and/or functions.

The processes according to embodiments of the present disclosure will be described in detail below with reference to FIGS. 2 to 6. For ease of understanding, the specific data mentioned in the following description are all illustrative and are not intended to limit the scope of protection of the present disclosure. It should be understood that the embodiments described below may also include additional actions not shown and/or may omit actions shown, and the scope of the present disclosure is not limited in this regard.

Figure 2:
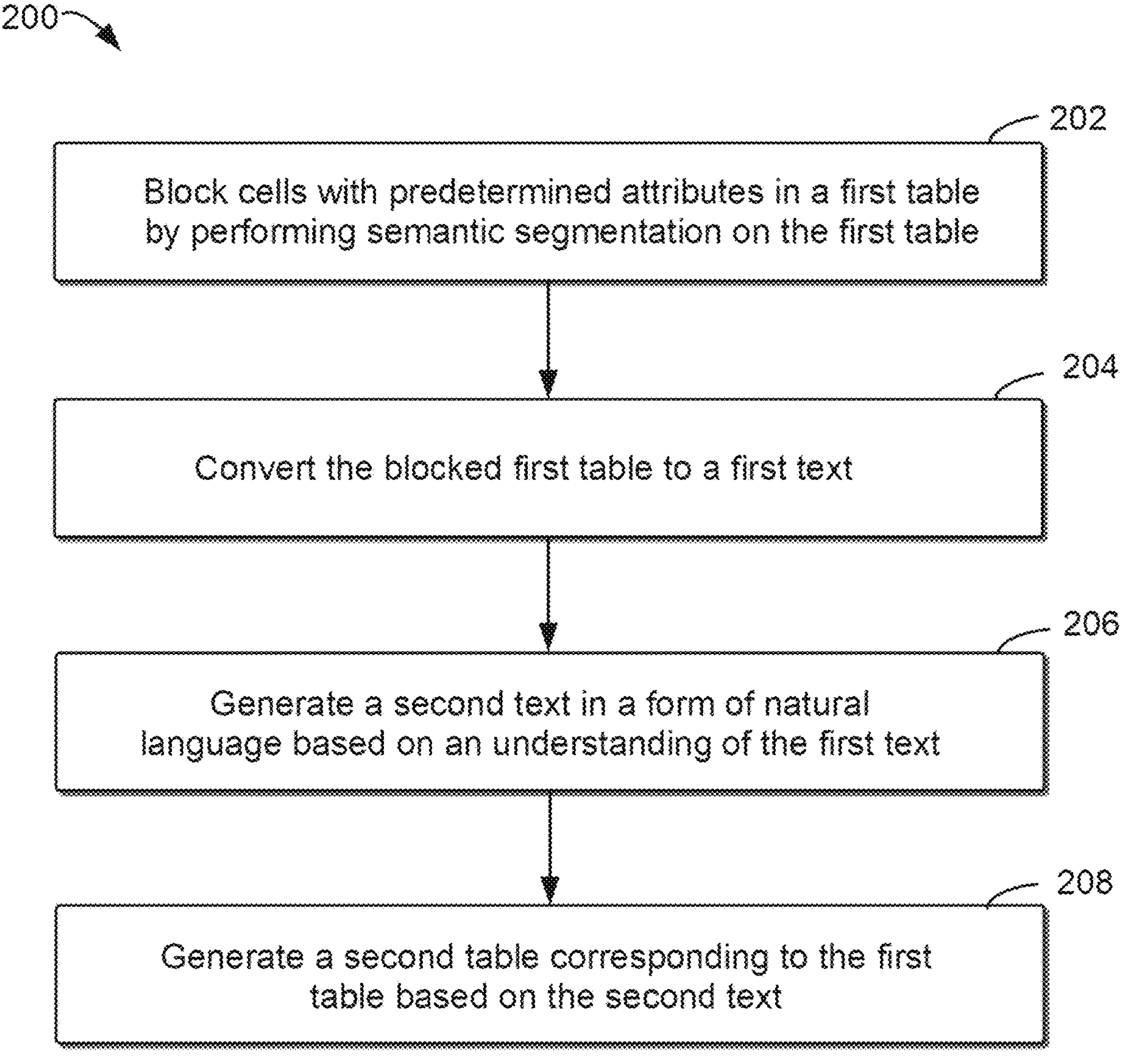
FIG. 2 is a flow chart of a method for generating a table according to some embodiments of the present disclosure.

FIG. 2 is a flow chart of a method 200 for generating a table according to some embodiments of the present disclosure. At block 202, cells with predetermined attributes in a first table are blocked by performing semantic segmentation on the first table, to obtain a blocked first table. For example, as shown in FIG. 1, the first table may be an original table 101, and in the processing of the original table 101, a step of semantic segmentation 103 is executed at first to identify and block the cells 102 with predetermined attributes. This process not only relates to data security, but more importantly, is an in-depth reflection of privacy protection. To this end, related technologies of semantic segmentation can be adopted according to actual needs. GCN is a powerful tool for semantic segmentation. A pre-trained GCN is an option. The pre-trained GAN is illustratively trained adequately on similar datasets and can be quickly and accurately applied to new table data. Alternatively, a specific GCN may be trained for the original table 101 to ensure that the model can be adapted to the data features of the original table 101.

At block 204, the blocked first table is converted to a first text. For example, as shown in FIG. 1, the first text may be a readable text 106, and conversion of the original table 104 to the readable text 106 may be realized by a data-to-text conversion 105. In selecting a particular method to utilize in the data-to-text conversion 105, the structural characteristics of the table, its content attributes, and the specific demands of target text are considered. Multiple conversion methods are available in relevant technical fields, from which one can be chosen flexibly according to specific conditions in practical applications to guarantee accurate and efficient table-to-text conversion.

At block 206, a second text in a form of natural language is generated based on an understanding of the first text. For example, as shown in FIG. 1, the second text may be the text 108, and in embodiments of the present disclosure, the text 108 in a form of natural language may be generated based on an understanding of the readable text 106 by a generative pre-trained model 107. The generative pre-trained model 107 may be one of the models for realizing the natural language processing ability through pre-training, e.g., a large language model. Using the text 108 in a form of natural language as an intermediate processing result can increase the transparency of table generation, lower the risk of data distortion, and improve the accuracy and consistency of synthetic data while protecting data privacy.

At block 208, a second table corresponding to the first table is generated based on the second text. For example, as shown in FIG. 1, the first table may be the original table 101, and the second table may be the synthetic table 110. When the sensitive or privacy information in the original table 101 needs protection, the synthetic table 110 may be generated by use of the table synthesizing model 109. This process starts from the input text 108, and the text 108 is a description, summary, or conversion in some form for the original table 101. The data of the synthetic table 110 is newly generated, which does not directly copy any sensitive or identifiable information in the original table 101. This means that the synthetic table 110, instead of the original table 101, may be utilized to perform data analysis, model training, or other purposes needing table data without leaking any privacy information.

In this way, the cells containing sensitive information can be identified and blocked, thereby retaining other useful information of the table while protecting privacy. Moreover, using the text in a form of natural language as an intermediate processing result can increase the transparency of table generation, lower the risk of data distortion, and improve the accuracy and consistency of synthetic data while protecting data privacy. This method not only helps promote the sharing and use of table data, but also can provide more reliable and effective data support.

Additional example processes will be specifically described below in conjunction with FIGS. 3 to 6. In embodiments of the present disclosure, explanation and description are made according to the order of reasoning and training of a table synthesizing model. The specific data referred to in the following description are exemplary and are not intended to limit the scope of protection of the present disclosure. It should be understood that the embodiments described below may also include additional actions not shown and/or may omit actions shown, and the scope of the present disclosure is not limited in this regard.

Figure 3:
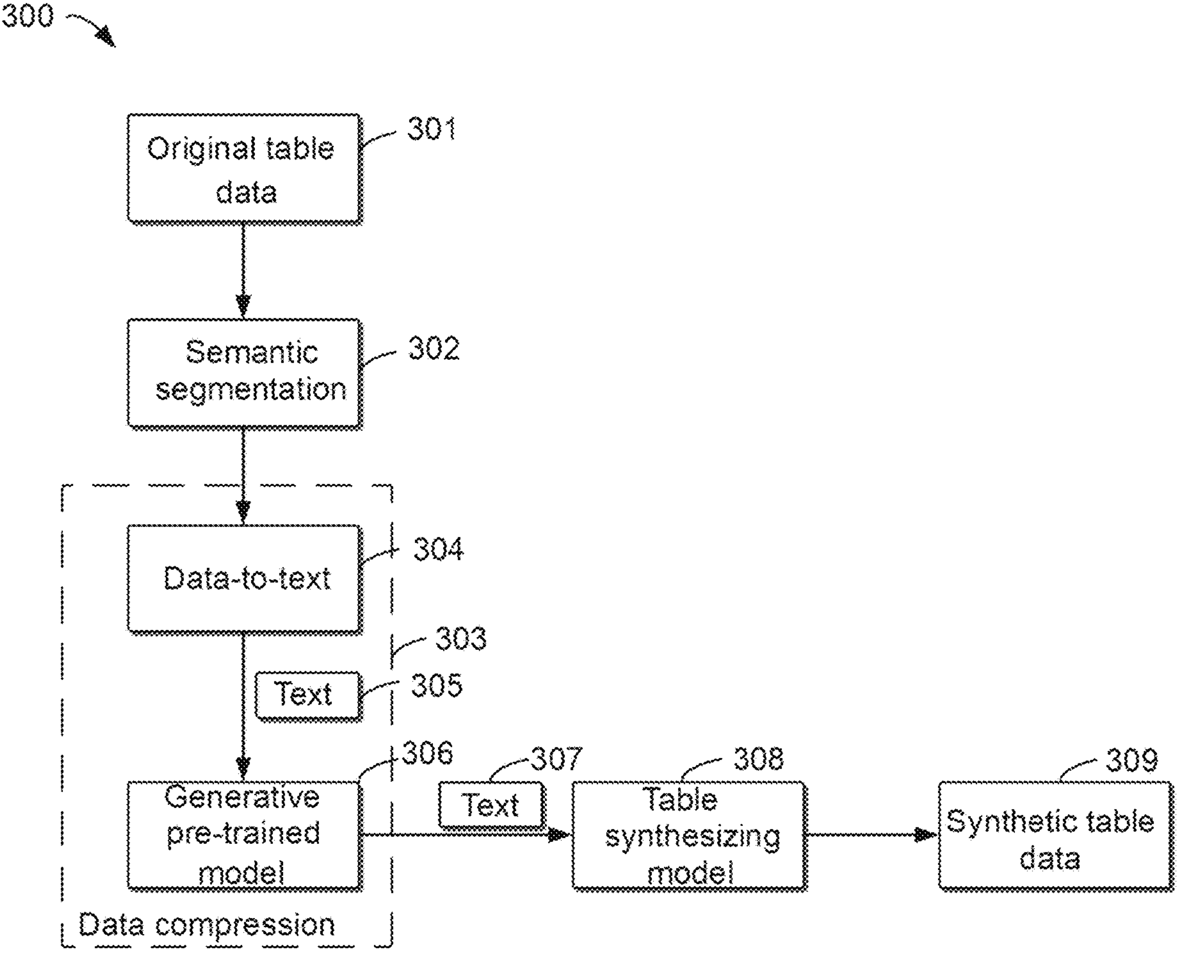
FIG. 3 is a schematic diagram of a process of reasoning using a table synthesizing model according to some embodiments of the present disclosure.

FIG. 3 is a schematic diagram of a process 300 of reasoning using a table synthesizing model 308 according to some embodiments of the present disclosure. Before a synthetic table is generated by use of the table synthesizing model 308, the table synthesizing model 308 may be trained at first, and in embodiments of the present disclosure, explanation and description are made according to the order of reasoning and training of the table synthesizing model 308. First, original table data 301 is acquired. For example, as shown in FIG. 1, the original table 101 typically refers to a data table that is directly collected or recorded without any processing or modification. The original table 101 contains the original data collected from real business scenarios or studies, and these data may be input by users, collected by machines, or acquired by other means. In some embodiments, the original table 101 may contain cells 102 with predetermined attributes, where the cells 102 with predetermined attributes may be cells containing sensitive information or other private information, such as personal identity information, financial information, and health condition information.

Semantic segmentation 302 is then performed on original table data. For example, as shown in FIG. 1, the purpose of semantic segmentation is to identify and block the cells 102 with predetermined attributes in the original table 101. In some embodiments, the semantic class of each cell in the original table 101 is learned with GCN, and then a blocking strategy is employed according to privacy requirements and data efficacy. GCN is a neural network capable of processing graph structure data, such as a table. The GCN contains a plurality of graph convolutional layers, and these layers may be used for building a knowledge graph according to the original table 101, where the nodes of the knowledge graph are corresponding to the cells of the original table 101, and the edges of the knowledge graph are corresponding to the links between adjacent cells. A semantic class may be preset in the GCN to determine the semantic class of each node in the knowledge graph; and each node in the knowledge graph may be assigned with some initial features, such as text content of cells, font size, alignment, or color. Then, the knowledge graph and node features are input into the GCN which outputs the probability distribution of a semantic class for each node.

In some embodiments, the GCN may be trained on a table data annotation set containing semantic classes by use of a cross-entropy loss function. After the completion of GCN training, the GCN is applied to the data of the original table 101 that needs protection. A blocking strategy is employed according to privacy requirements and data efficacy. The blocking strategy determines which cells should be completely concealed or deleted from the table. In this way, other useful information of the table can be retained while protecting sensitive information to lay a foundation for follow-up data analysis and sharing.

Data compression 303 is then performed on the original table data 301 after semantic segmentation 302. In embodiments of the present disclosure, the data compression includes data-to-text conversion 304 and a generative pre-trained model 306. The data-to-text conversion 304 is used for converting the blocked original table data to a readable text 305. In some embodiments, the data-to-text conversion 304 may include a content selection module for selecting the most relevant cells with the largest information quantity from the original table, a sentence planning module for organizing the selected cells into a coherent and concise structure, and a surface realization module for generating the readable text 305 from the structured data.

In the application of the data-to-text conversion 304, the content selection module may be utilized at first to filter out the blocked or empty cells, and identify the cells containing important information, such as titles, keys, values, or aggregated values. Then, the sentence planning module is employed to group the selected cells into logic units, such as rows, columns, or subtables. In some embodiments, heuristic methods may also be used for determining the order and emphases of the cells. For example, priority may be given to the processing of the cells with larger values, higher frequencies, and more changes. The surface realization module is then employed to generate the readable text 305 from the structured data, which guarantees the grammatical accuracy, readability, and fluency of sentences by use of linguistic rules. The readable text 305 summarizes the original table data 301 after the segmentation and blocking, and retains some efficacy of the original table data 301, such as distribution, correlation, or mode.

A text in a form of natural language is generated by the generative pre-trained model 306. More particularly, after generation of the readable text 305, the generative pre-trained model 306 may be utilized to understand the readable text 305 and generate a text 307 in a form of natural language. A table synthesizing model 308 generates synthetic table data 309 according to the text 307. Using the text 307 as an intermediate processing result can increase the transparency of table generation, lower the risk of distortion of the synthetic table data 309, and improve the accuracy of the synthetic table data 309 and the consistency between the original table data 301 and the synthetic table data 309, while protecting data privacy.

Figure 4:
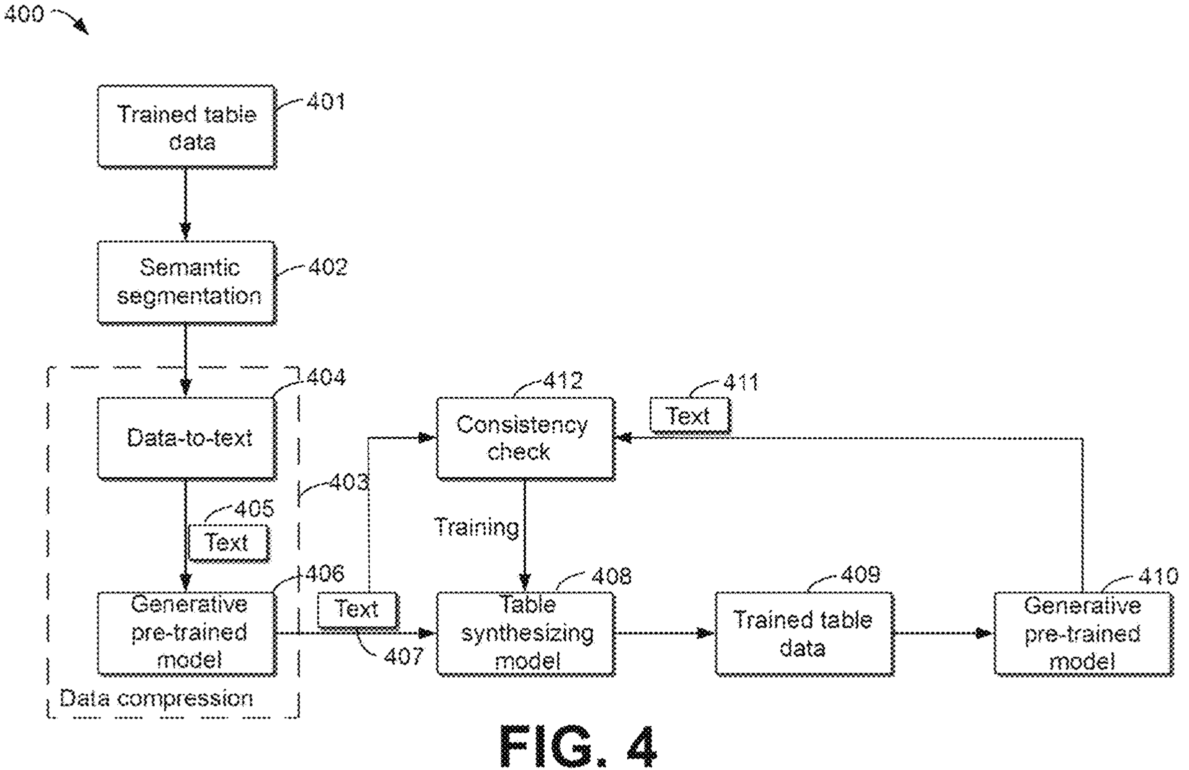
FIG. 4 is a schematic diagram of a process of training a table synthesizing model according to some embodiments of the present disclosure.

FIG. 4 is a schematic diagram of a process 400 of training a table synthesizing model according to some embodiments of the present disclosure. First, trained table data 401 is acquired. The trained table data 401 may include original table data, which typically refers to a data table that is directly collected or recorded without any processing or modification. Semantic segmentation 402 is then performed on the trained table data. The purpose of semantic segmentation 402 is to identify and block the cells with predetermined attributes in the trained table data 401. The cells with predetermined attributes may be cells containing sensitive information or other private information, such as personal identity information, financial information, and health condition information. Data compression 403 is then performed on the trained table data after semantic segmentation. Data compression 403 includes data-to-text conversion 404 and a generative pre-trained model 406. The data-to-text conversion 404 is used for converting the blocked trained table data 401 to a readable trained text 405, and after generation of the readable trained text 405, the generative pre-trained model 406 may be utilized to understand the readable trained text 405 and generate a trained text 407 in a form of natural language. After the generation of the trained text 407, a table synthesizing model 408 generates trained table data 409 according to the input trained text 407.

In some embodiments, the table synthesizing model 408 may be a conditional tabular generative adversarial model, a large language model, or another model with data processing ability, which may be specifically selected according to actual needs. If the table synthesizing model 408 is a conditional tabular generative adversarial model, it includes a generator, a discriminator, and an encoder. In the process of generating the trained table data 409 according to the trained text 407 in a form of natural language, the table synthesizing model 408 encodes the trained text 407 into a potential vector at first, where the potential vector can capture the hybrid data type and data distribution; and the encoder is used for converting the trained text 407 to a compact form of representation to better capture the internal structure and mode of the trained table data 409. Then, the generator receives the trained text 407 in a form of natural language and generates the trained table data 409 as output according to the trained text 407, where the trained table data 409 may be the synthetic table data corresponding to the trained table data 401. The discriminator receives the trained table data 401 and the trained text 407 as input and outputs the probability of authenticity or falsification of the data.

In the process of generating the trained table data 409 with the conditional tabular generative adversarial model, the generator creates table data according to the description of the input trained text 407. The generator may adopt a self-attention mechanism and a pre-trained language model to learn mapping from natural language to table data. The generator also may improve the efficacy of the synthetic data for specific tasks by use of downstream loss, such as classification loss or regression loss. Meanwhile, the discriminator keeps performing adversarial training with the generator to enhance its ability in distinguishing between real data and synthetic data. Such adversarial training helps the generator in the generation of synthetic data that is more truthful and better conforms to original data distribution. The discriminator may also adopt a self-attention mechanism and a pre-trained language model, such as a bidirectional and autoregressive transformer (BART), to learn alignment and consistency between natural language and table data. In addition, the discriminator may make use of Wasserstein loss with gradient penalty to improve the training convergence and stability.

If the table synthesizing model 408 adopts the conditional tabular generative adversarial model, it may be trained by adding a noise or disturbance to the gradients of the generator and the discriminator to ensure that the generator and the discriminator satisfy ∈-differential privacy, and a privacy accountant may also be utilized to track the privacy budget and privacy loss in the training process. The use of differential privacy can provide a privacy protection mechanism in the training process of the table synthesizing model 408, and protect the privacy of original data from leakage while generating high-quality synthetic data. This method can retain the features and distribution of original data, generate high-quality synthetic data, and effectively protect data privacy.

In some embodiments, the table synthesizing model 408 also may be trained according to consistency check 412. After the generation of the trained table data 409, a trained text 411 in a form of natural language may be generated by a generative pre-trained model 410 according to the trained table data 409. Since the synthetic data should be able to replace original data, and the synthetic data should be able to mimic the features of original data, such as distribution, correlation, and mode, the table synthesizing model 408 can be trained further by improving the consistency between the trained text 407 and the trained text 411 to improve the quality of synthetic data.

Figure 5:
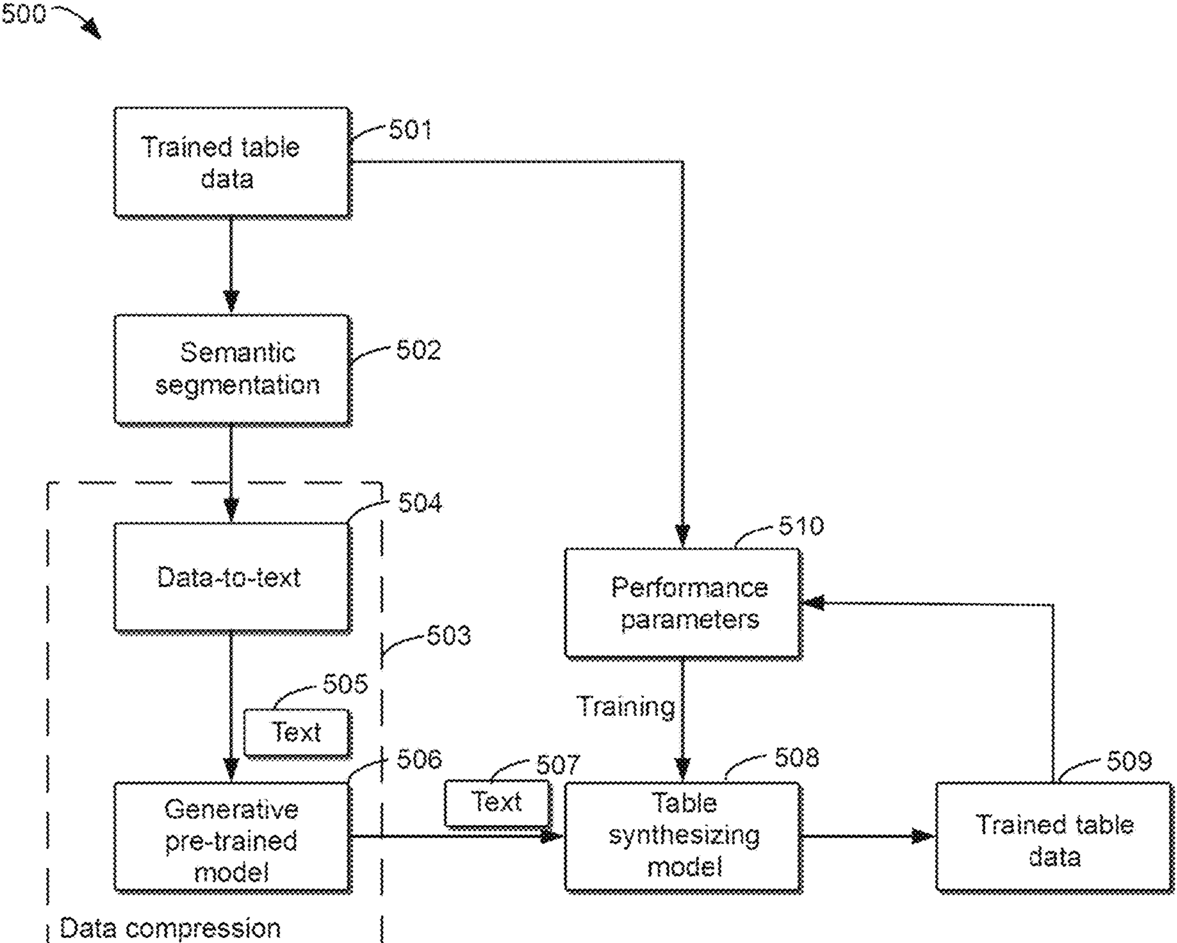
FIG. 5 is a schematic diagram of another process of training a table synthesizing model according to some embodiments of the present disclosure.

FIG. 5 is a schematic diagram of another process 500 of training a table synthesizing model according to some embodiments of the present disclosure. First, trained table data 501 is acquired. The trained table data 501 may include original table data, which typically refers to a data table that is directly collected or recorded without any processing or modification. Semantic segmentation 502 is then performed on the trained table data. The purpose of semantic segmentation 502 is to identify and block the cells with predetermined attributes in the trained table data 501. The cells with predetermined attributes may be cells containing sensitive information or other private information, such as personal identity information, financial information, and health condition information. Data compression 503 is then performed on the trained table data after semantic segmentation 502. Data compression 503 includes data-to-text conversion 504 and a generative pre-trained model 506. The data-to-text conversion 504 is used for converting the blocked trained table data 501 to a readable trained text 505, and after generation of the readable trained text 505, the generative pre-trained model 506 may be utilized to understand the readable trained text 505 and generate a trained text 507 in a form of natural language. After the generation of the trained text 507, a table synthesizing model 508 generates trained table data 509 according to the input trained text 507.

In some embodiments, the table synthesizing model 508 may be trained by setting an active learning mechanism, e.g., comparing the trained table data 501 and the trained table data 509 by use of performance parameters 510, to assess the synthesis quality and efficacy of the table synthesizing model 508, where the performance parameters 510 may include Fréchet inception distance (FID), maximum mean discrepancy (MMD), Kullback-Leibler divergence (KL divergence), downstream task performance parameters, etc.

FID is an indicator for assessing a distance between the feature distributions of an original dataset and a synthetic dataset. FID extracts features from table data points using a pre-trained cognitive network and then calculates the Fréchet distance between feature mean and covariance. The lower the FID score, the higher the quality of the synthetic dataset. MMD is an indicator for assessing a distance between the probability distributions of an original dataset and a synthetic dataset. MMD maps the table data points to a high-dimensional feature space using a kernel function and then calculates the maximum mean difference between the mean embeddings of the data points. The lower the MMD score, the higher the quality of the synthetic dataset. KL divergence is an indicator for assessing a difference between the entropies of an original dataset and a synthetic dataset. KL divergence calculates a logarithmic ratio between the probability densities of real data points and synthetic data points on each attribute or field. The lower the KL divergence score, the higher the quality of the synthetic dataset. The table synthesizing model 508 can be comprehensively evaluated for synthesis quality and efficacy by use of the performance parameters 510, and adjusted and optimized according to the evaluation results to generate higher-quality synthetic data.

With the active learning mechanism, the generated synthetic table data is enabled to cover possible ranges and changes of the original table data, such that the synthetic table data is more comprehensive and representative. For example, the system, when identifying a difference between the trained table data 501 and the trained table data 509, may make a request for a specific type of data. If the system detects inadequate or excessive expression of some attributes or fields in the trained table data 509, it may make a request for more data points containing these attributes or fields. This is helpful in generating synthetic table data able to cover possible ranges and changes of the original table data and being more comprehensive and representative.

Figure 6:
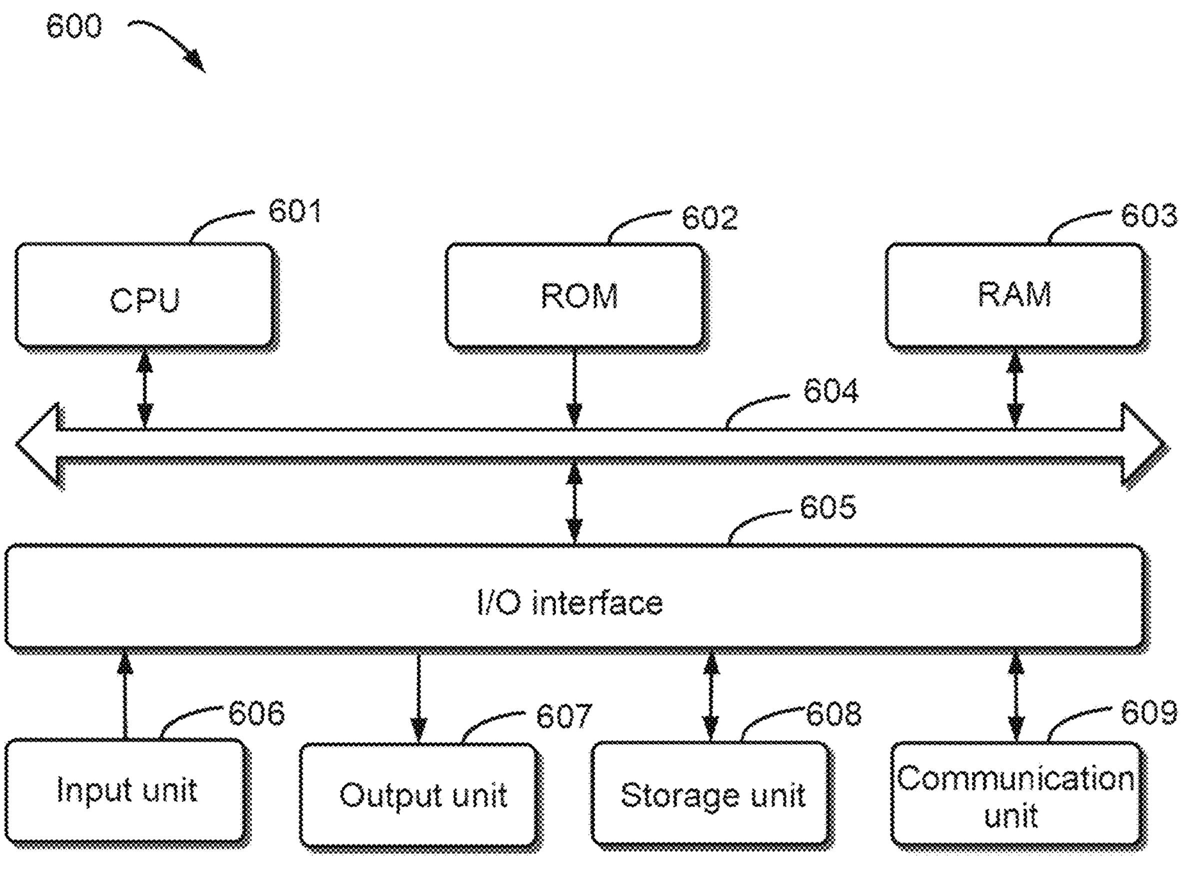
FIG. 6 is a block diagram of a device that can implement a plurality of embodiments of the present disclosure.

FIG. 6 is a block diagram of an example device 600 that can be used to implement embodiments of the present disclosure. As shown in the figure, the device 600 includes a computing unit 601, illustratively a central processing unit (CPU), that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The computing unit 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The computing unit 601 may be various general-purpose and/or special-purpose processing components with processing and computing power. Some examples of the computing unit 601 include, but are not limited to, the above-noted CPU, a graphics processing unit (GPU), various specialized artificial intelligence (AI) computing chips, various computing units for running machine learning model algorithms, a digital signal processor (DSP), and any appropriate processor, controller, microcontroller, and the like. The computing unit 601 performs various methods and processes described above, such as the method 200. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. When the computer program is loaded to the RAM 603 and executed by the computing unit 601, one or more steps of the method 200 described above may be performed. Alternatively, in other embodiments, the computing unit 601 may be configured to implement the method 200 in any other suitable manners (such as by means of firmware).

The functions described herein may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program codes for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method, comprising:

blocking cells with predetermined attributes in a first table by performing semantic segmentation on the first table, in a first machine learning model of a processor-based machine learning system, to obtain a blocked first table;

converting the blocked first table to a first text in a data-to-text converter of the processor-based machine learning system;

applying the first text to a second machine learning model of the processor-based machine learning system, the second machine learning model being different than the first machine learning model, the second machine learning model comprising a generative pre-trained model configured for generating a second text in a form of natural language based on an understanding of the first text, the understanding of the first text being determined by the generative pre-trained model; and generating, in a third machine learning model of the processor-based machine learning system, a second table corresponding to the first table based on the second text, the third machine learning model being different than the first and second machine learning models;

wherein the third machine learning model is trained utilizing input and output trained table data and one or more corresponding trained texts that are generated based on at least one of the input and output trained table data.

2. The method according to claim 1, wherein blocking cells with predetermined attributes in a first table by performing semantic segmentation on the first table comprises:

building a knowledge graph based on the first table, nodes of the knowledge graph corresponding to a knowledge graph of the cells of the first table;

determining a semantic class of each node in the knowledge graph based on semantic classes and a pre-trained graph convolutional model; and blocking cells with predetermined attributes in the first table based on the semantic class of each node.

3. The method according to claim 1, wherein converting the blocked first table to a first text comprises:
selecting cells needed in the blocked first table based on a preset strategy;
determining structured data based on the selected cells; and
generating the first text based on the structured data.

4. The method according to claim 1, wherein
the data-to-text converter and the generative pre-trained model collectively implement a data compression component of the processor-based machine learning system.

5. The method according to claim 1, wherein
the third machine learning model comprises a table synthesizing model.

6. The method according to claim 5, further comprising:
blocking cells with predetermined attributes in a first trained table by performing semantic segmentation on the first trained table;
converting the blocked first trained table to a first trained text;
generating a second trained text in a form of natural language based on an understanding of the first trained text;
generating a second trained table corresponding to the first trained table based on the second trained text; and
training the table synthesizing model based on the first trained table and the second trained table.

7. The method according to claim 6, wherein training the table synthesizing model further comprises:
generating a third trained text in a form of natural language based on an understanding of the second trained table by a second generative pre-trained model; and
training the table synthesizing model based on the first trained table, the second trained table, the second trained text, and the third trained text.

8. The method according to claim 7, wherein training the table synthesizing model further comprises:
determining performance parameters based on the first trained table and the second trained table; and
training the table synthesizing model based on the first trained table, the second trained table, the second trained text, the third trained text, and the performance parameters.

9. The method according to claim 5, wherein the table synthesizing model comprises a generator and a discriminator, and the method further comprises:
training the table synthesizing model by adding a noise or disturbance to gradients of the generator and the discriminator.

10. An electronic device, comprising:
at least one processor; and
memory coupled to the at least one processor and having instructions stored therein, wherein the instructions, when executed by the at least one processor, cause the electronic device to perform actions, the actions comprising:
blocking cells with predetermined attributes in a first table by performing semantic segmentation on the first table, in a first machine learning model of a processor-based machine learning system, to obtain a blocked first table;
converting the blocked first table to a first text in a data-to-text converter of the processor-based machine learning system;
applying the first text to a second machine learning model of the processor-based machine learning system, the second machine learning model being different than the first machine learning model, the second machine learning model comprising a generative pre-trained model configured for generating a second text in a form of natural language based on an understanding of the first text, the understanding of the first text being determined by the generative pre-trained model; and
generating, in a third machine learning model of the processor-based machine learning system, a second table corresponding to the first table based on the second text, the third machine learning model being different than the first and second machine learning models;
wherein the third machine learning model is trained utilizing input and output trained table data and one or more corresponding trained texts that are generated based on at least one of the input and output trained table data.

11. The electronic device according to claim 10, wherein blocking cells with predetermined attributes in a first table by performing semantic segmentation on the first table comprises:
building a knowledge graph based on the first table, nodes of the knowledge graph corresponding to the cells of the first table;
determining a semantic class of each node in the knowledge graph based on semantic classes and a pre-trained graph convolutional model; and
blocking cells with predetermined attributes in the first table based on the semantic class of each node.

12. The electronic device according to claim 10, wherein converting the blocked first table to a first text comprises:
selecting cells needed in the blocked first table based on a preset strategy;
determining structured data based on the selected cells; and
generating the first text based on the structured data.

13. The electronic device according to claim 10, wherein
the data-to-text converter and the generative pre-trained model collectively implement a data compression component of the processor-based machine learning system.

14. The electronic device according to claim 10, wherein
the third machine learning model comprises a table synthesizing model.

15. The electronic device according to claim 14, further comprising:
blocking cells with predetermined attributes in a first trained table by performing semantic segmentation on the first trained table;
converting the blocked first trained table to a first trained text;
generating a second trained text in a form of natural language based on an understanding of the first trained text;
generating a second trained table corresponding to the first trained table based on the second trained text; and
training the table synthesizing model based on the first trained table and the second trained table.

16. The electronic device according to claim 15, wherein training the table synthesizing model further comprises:
generating a third trained text in a form of natural language based on an understanding of the second trained table by a second generative pre-trained model; and
training the table synthesizing model based on the first trained table, the second trained table, the second trained text, and the third trained text.

17. The electronic device according to claim 16, wherein training the table synthesizing model further comprises:

determining performance parameters based on the first trained table and the second trained table; and training the table synthesizing model based on the first trained table, the second trained table, the second trained text, the third trained text, and the performance parameters.

18. The electronic device according to claim 14, wherein the table synthesizing model comprises a generator and a discriminator, and the actions further comprise:

training the table synthesizing model by adding a noise or disturbance to gradients of the generator and the discriminator.

19. A computer program product comprising a non-transitory computer-readable medium having machine-executable instructions stored therein, wherein the machine-executable instructions, when executed by a machine, cause the machine to perform actions, the actions comprising:

blocking cells with predetermined attributes in a first table by performing semantic segmentation on the first table, in a first machine learning model of a processor-based machine learning system, to obtain a blocked first table;

converting the blocked first table to a first text in a data-to-text converter of the processor-based machine learning system;

applying the first text to a second machine learning model of the processor-based machine learning system, the second machine learning model being different than the first machine learning model, the second machine learning model comprising a generative pre-trained model configured for generating a second text in a form of natural language based on an understanding of the first text, the understanding of the first text being determined by the generative pre-trained model; and generating, in a third machine learning model of the processor-based machine learning system, a second table corresponding to the first table based on the second text, the third machine learning model being different than the first and second machine learning models;

wherein the third machine learning model is trained utilizing input and output trained table data and one or more corresponding trained texts that are generated based on at least one of the input and output trained table data.

20. The computer program product according to claim 19, wherein blocking cells with predetermined attributes in a first table by performing semantic segmentation on the first table comprises:

building a knowledge graph based on the first table, nodes of the knowledge graph corresponding to the cells of the first table;

determining a semantic class of each node in the knowledge graph based on semantic classes and a pre-trained graph convolutional model; and blocking cells with predetermined attributes in the first table based on the semantic class of each node.

* * * * *